United States Patent
Aoki et al.

(10) Patent No.: US 8,578,710 B2
(45) Date of Patent: Nov. 12, 2013

(54) CUP SEAL, AND MASTER CYLINDER IN WHICH IT IS USED

(75) Inventors: Tomohiro Aoki, Saitama-Ken (JP); Masaki Shiwa, Saitama-Ken (JP)

(73) Assignee: Bosch Corporation, Tokyo (JP)

( * ) Notice: Subject to any disclaimer, the term of this patent is extended or adjusted under 35 U.S.C. 154(b) by 942 days.

(21) Appl. No.: 12/672,707

(22) PCT Filed: Jan. 17, 2008

(86) PCT No.: PCT/JP2008/050917
§ 371 (c)(1),
(2), (4) Date: Feb. 9, 2010

(87) PCT Pub. No.: WO2009/022476
PCT Pub. Date: Feb. 19, 2009

(65) Prior Publication Data
US 2011/0209472 A1 Sep. 1, 2011

(30) Foreign Application Priority Data
Aug. 10, 2007 (JP) .................................. 2007-209957

(51) Int. Cl.
F16J 15/32 (2006.01)
B60T 11/16 (2006.01)

(52) U.S. Cl.
USPC ............................................ 60/588; 277/436

(58) Field of Classification Search
USPC ............................ 60/562, 588, 589; 277/436
See application file for complete search history.

(56) References Cited

U.S. PATENT DOCUMENTS

| 2004/0194462 A1 | 10/2004 | Sunohara et al. |
| 2005/0115237 A1 | 6/2005 | Tsubouchi et al. |
| 2006/0064978 A1 * | 3/2006 | Mouri et al. ............... 60/562 |
| 2006/0219507 A1 | 10/2006 | Drott et al. |

FOREIGN PATENT DOCUMENTS

| JP | 2004210229 A | 7/2004 |
| JP | 2005186925 A | 7/2005 |
| JP | 2006123879 A | 5/2006 |
| JP | 2007502737 A | 2/2007 |

OTHER PUBLICATIONS

Microfilm of the specification and drawings annexed to the request of Japanese Model Application No. 129560/1984 (Laid-open No. 44046/1986), Tachikawa Spring Co., Ltd., Mar. 24, 1986.

* cited by examiner

Primary Examiner — Thomas E Lazo
(74) Attorney, Agent, or Firm — Michael Best & Friedrich LLP

(57) ABSTRACT

A cup seal (21) of the invention includes an intermediate lip portion (21d), positioned between an inner lip portion (21b) and an outer lip portion (21c), provided in a base portion (21a). The intermediate lip portion (21d) is configured in such a way that first intermediate lip portions ($21d_1$), communication passages ($21d_3$), second intermediate lip portions ($21d_2$), whose axial direction length is less than that of the first intermediate lip portions ($21d_1$), and the communication passages ($21d_3$), which have no lip portion, are cyclically disposed, in this order, in the peripheral direction. An easy elastic deformation portion of the base portion (21a) which elastically deforms easily is formed by the second intermediate lip portions ($21d_2$) and communication passages ($21d_3$) and, by the easy elastic deformation portion elastically deforming easily when supplying liquid, a flow passage with a larger passage area is formed.

8 Claims, 5 Drawing Sheets

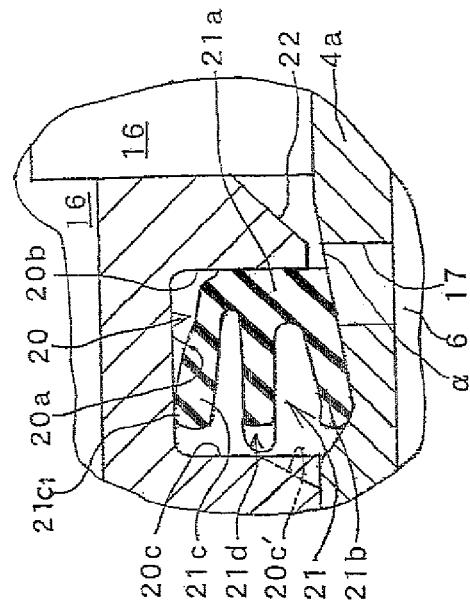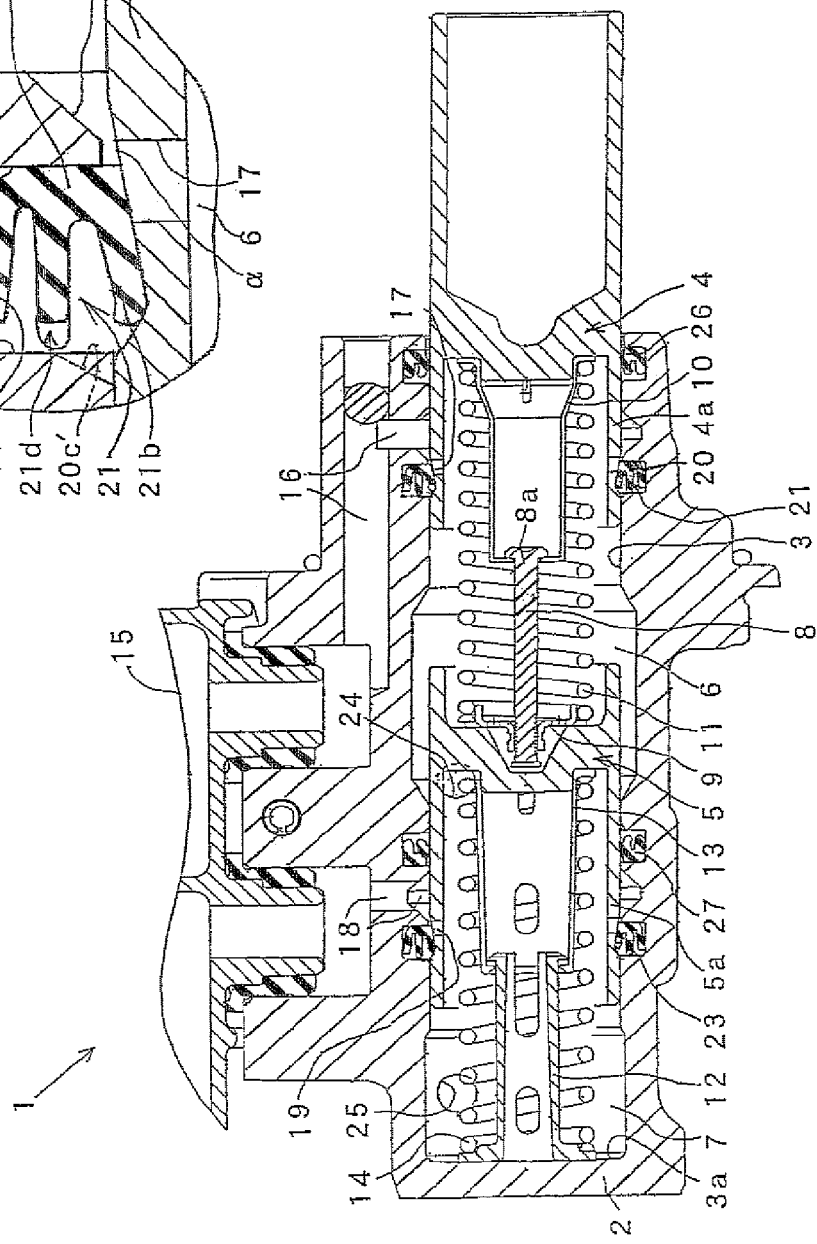

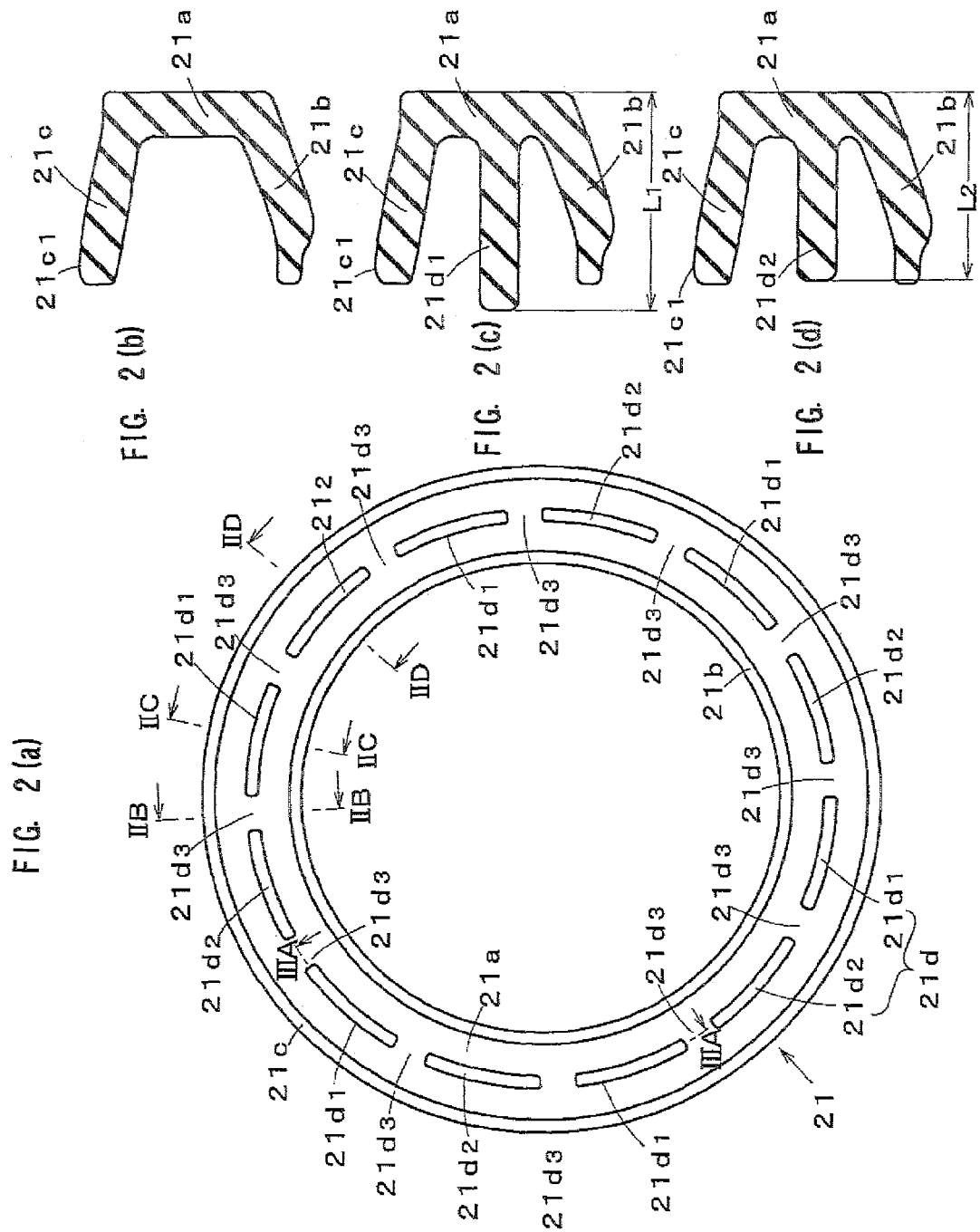

CUP SEAL, AND MASTER CYLINDER IN WHICH IT IS USED

BACKGROUND ART

The present invention relates to a technical field of a cup seal, and a plunger type master cylinder including the cup seal, used in a cylinder device configured of a cylinder, such as a master cylinder of a brake or clutch in a vehicle such as an automobile, and a sliding member disposed in such a way that it can move inside the cylinder relative to the axial direction thereof.

To date, in a hydraulic brake system or hydraulic clutch system of an automobile, a master cylinder which generates hydraulic pressure in accordance with a tread force of a brake pedal or clutch pedal has been used to operate a brake or clutch. As the master cylinder, a plunger type master cylinder including a cylinder main body which has a cylinder hole, a piston, slidably inserted into the cylinder hole, which demarcates a hydraulic chamber, a communication passage, provided in the cylinder main body, which communicates with a reservoir, a relief port, formed in the piston, which connects the communication passage and hydraulic chamber, and a seal member which, as well as being housed in a depressed portion of the inner peripheral surface of the cylinder hole of the cylinder main body, is slidably passed through by the piston, and seals a space between the inner peripheral surface of the cylinder hole and the outer peripheral surface of the piston, is known from JP-A-2006-123879.

With the plunger type master cylinder, at an inoperative time, the relief port of the piston and the communication passage not being blocked off by the seal member, the hydraulic chamber communicates with the reservoir via the relief port and communication passage. Consequently, at the inoperative time, the inside of the hydraulic chamber is at atmospheric pressure, and no hydraulic pressure is generated. On the piston advancing to the hydraulic chamber side due to a pressing down upon the brake pedal or clutch pedal, the relief port and communication passage are blocked off by the seal member, and the hydraulic chamber is blocked off from the reservoir. Because of this, hydraulic pressure is generated in the hydraulic chamber along with the advancing of the piston.

A sealing function for preventing the hydraulic pressure from leaking when the hydraulic pressure is generated by the advancing of the piston, and a pumping function, which is a liquid supply function supplying braking liquid of the reservoir to the hydraulic chamber in order to increase responsiveness when the piston withdraws, are required of the seal member used in the plunger type master cylinder. Therein, in order to cause the seal member to fulfill these two functions, a cup seal is employed as the seal member.

A master cylinder using a cup seal of which a radial direction cross-section is formed in an E shape as the cup seal is proposed by the previously described 2006-123879. The E-type cup seal described in 2006-123879 includes a circular base portion, an inner peripheral lip portion projecting from the inner peripheral side of the base portion, an outer peripheral lip portion projecting from the outer peripheral side of the base portion, and an intermediate lip portion projecting from the base portion between the inner peripheral lip portion and the outer peripheral lip portion.

The inner peripheral lip portion, outer peripheral lip portion, and intermediate lip portion are all formed in a continuous circular shape. Also, a plurality of cutout grooves are formed, leaving intervals in the peripheral direction, in the leading end side of the intermediate lip portion. Then, by causing the hydraulic fluid to flow through the plurality of cutout grooves when loading hydraulic fluid into the master cylinder when removing the air of the master cylinder, it is possible to supply sufficient hydraulic fluid.

However, with the cup seal described in JP-A-2006-123879, the intermediate lip portion is provided continuously over the whole periphery. For this reason, the intermediate lip portion exerts a rib effect, and the base portion of the cup seal is comparatively stiff. In this case, the plurality of cutout grooves are formed in the leading end portion of the intermediate lip portion but, even though the cutout grooves are formed, the stiffness of the base portion of the cup seal barely changes. When the base portion is stiff in this way, it is difficult for the base portion to elastically deform. Consequently, the base portion barely elastically deforming when supplying hydraulic fluid to the master cylinder, the base portion does not greatly separate from a side wall of a housing depressed portion housing the cup seal of the master cylinder. For this reason, no large gap being formed between the base portion of the cup seal and the housing depressed portion, it is difficult to form a liquid passage with a sufficiently large passage area. Consequently, even when forming the cutout grooves in the leading end portion of the intermediate lip portion, there is a problem in that there is a limit to the supply of the hydraulic fluid, and a certain amount of time is needed to supply a sufficient amount of hydraulic fluid.

DISCLOSURE OF THE INVENTION

An object of the invention is to provide a cup seal with which it is possible to make a base portion effectively elastically deformable, and form a liquid passage with a larger passage area between the base portion and a depressed portion in which it is housed.

Another object of the invention is to provide a master cylinder with which a hydraulic pressure generation is reliable, and moreover, it is possible to further increase responsiveness when a piston withdraws.

In order to achieve the objects, a cup seal according to the invention, is characterized by including at least a circular base portion housed in a depressed portion and extending in a radial direction, a circular inner lip portion disposed in the base portion extending in an axial direction from the inner peripheral side end portion thereof, a circular outer lip portion disposed in the base portion extending in the axial direction from the outer peripheral side end portion thereof, and separably making contact with a bottom wall of the depressed portion, and an intermediate lip portion disposed in the base portion, positioned between the inner lip portion and outer lip portion, extending in the axial direction, wherein the base portion includes an easy elastic deformation portion, which elastically deforms in the axial direction comparatively easily, and a difficult elastic deformation portion, which does not elastically deform in the axial direction as easily as the easy elastic deformation portion.

Also, the cup seal according to the invention is characterized in that in the intermediate lip portion, a plurality of lip portions being disposed in a circular form, and intermittently, either side of portions with no lip portion which set predetermined intervals in a peripheral direction, at least one of an axial direction length and thickness of intermediate lip portions, of the plurality of lip portions, disposed in the easy elastic deformation portion of the base portion is set to be less than that of intermediate lip portions disposed in the difficult elastic deformation portion of the base portion.

Furthermore, the cup seal according to the invention is characterized in that the intermediate lip portions disposed in the easy elastic deformation portion of the base portion, and the intermediate lip portions disposed in the difficult elastic deformation portion of the base portion, are disposed alternately, either side of the portions with no lip portion.

Furthermore, a master cylinder according to the invention is characterized by including a cylinder main body which has a cylinder hole, a piston, slidably inserted into the cylinder hole, which demarcates a hydraulic chamber, a communication passage, provided in the cylinder main body, which communicates with a reservoir in which is stored a hydraulic fluid, a relief port, formed in the piston, which constantly communicates with the hydraulic chamber, and connects the communication passage and hydraulic chamber, and a seal member which is housed in a depressed portion of the inner peripheral surface of the cylinder hole of the cylinder main body, is slidably passed through by the piston, and seals a space between the inner peripheral surface of the cylinder hole and the outer peripheral surface of the piston, wherein the communication passage and relief port communicate at an inoperative time, and at an operative time, the piston moves, and the communication passage and relief port are blocked off by the seal member, wherein the seal member is configured of the cup seal of the invention as described above.

According to the cup seal according to the invention configured in this way, as the base portion has an easy elastic deformation portion which elastically deforms in the axial direction comparatively easily, when causing the hydraulic fluid to flow from the back surface side of the base portion of the cup seal housed in the depressed portion, past the outer peripheral surface of the outer lip portion of the cup seal, to the front surface side of the cup seal, it is easily possible to cause the base portion to elastically deform in the axial direction due to a difference in pressure in front of and behind the cup seal.

Consequently, when causing the hydraulic fluid to flow from the back surface side of the cup seal to the front surface side in this way, the easy elastic deformation portion of the base portion elastically deforms, easily separating from a side wall of the depressed portion and, as well as it being possible to prevent a sticking of the base portion to the side wall, it is possible to reliably open a valve in a check valve function included in the cup seal. Then, as it is possible to prevent a sticking of the base portion to the side wall, it is possible to form a flow passage with a larger passage area between the base portion and the depressed portion in which it is housed.

Also, according to the master cylinder of the invention, as the easy elastic deformation portion of the base portion of the cup seal elastically deforms easily when supplying the hydraulic fluid to the hydraulic chamber, it is possible to form a hydraulic fluid flow passage with a large passage area. Because of this, it being possible to supply a large amount of hydraulic fluid to the hydraulic chamber when supplying the hydraulic fluid, it is possible to increase liquid suppliability.

Furthermore, as a large amount of hydraulic fluid can be supplied to the hydraulic chamber due to the cup seal, it is possible to carryout the withdrawal of the piston smoothly and swiftly when the operation is stopped. Consequently, it is possible to increase responsiveness when the piston withdraws.

In this way, according to the master cylinder according to the invention, it is possible to increase the responsiveness when the operation is stopped, while maintaining the pressure in the hydraulic chamber at a high level at an operative time, and moreover, it is possible to obtain a good liquid suppliability.

BRIEF DESCRIPTION OF THE DRAWINGS

FIG. 1(a) is a vertical sectional view showing one example of an embodiment of a master cylinder including a cup seal according to the invention, and FIG. 1(b) is a partial enlargement d of a first cup seal portion in FIG. 1(a);

FIGS. 2(a) to (d) are diagrams showing one example of an embodiment of a cup seal used in the master cylinder of the example shown in FIG. 1;

BEST MODE FOR CARRYING OUT THE INVENTION

Figure 3:
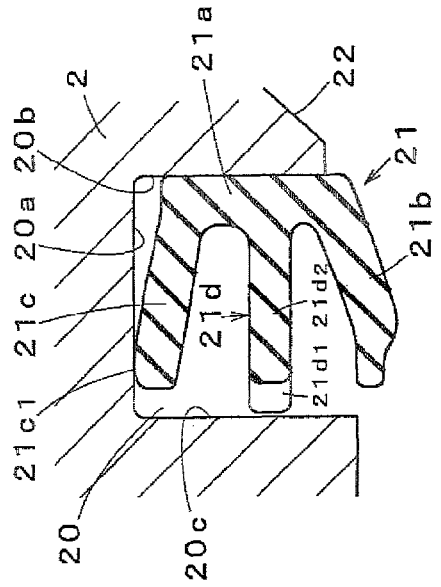
FIG. 3(a) is a diagram showing behavior of the cup seal of the example shown in FIG. 2 at an activation time of the master cylinder.
FIG. 3(b) is a sectional view along the line IIIB-IIIB in FIG. 3(a)
FIG. 3(c) is a diagram showing behavior of the cup seal of the example shown in FIG. 2 at a liquid supply time of the master cylinder.
FIG. 3(d) is a sectional view along the line IIID-IIID in FIG. 3(c)
Figure 3:
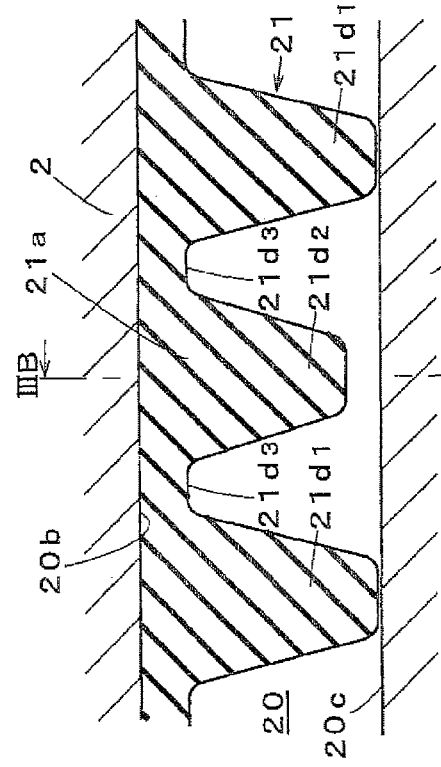
Figure 3:
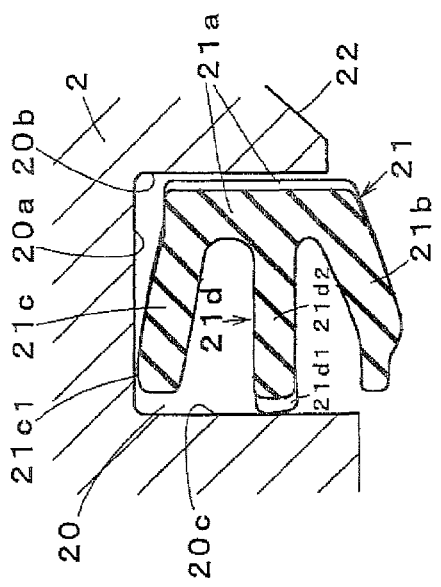
Figure 3:
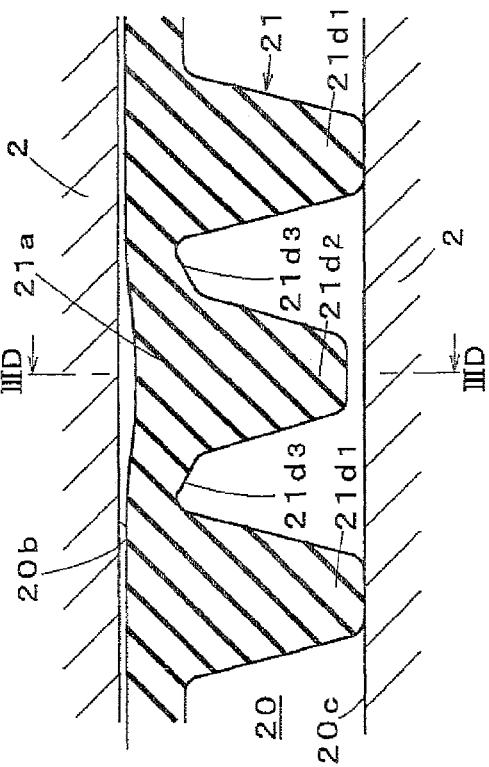

Hereafter, using the drawings, a description will be given of a best mode for carrying out the invention.

FIG. 1(a) is a vertical sectional view showing one example of an embodiment of a master cylinder including a cup seal according to the invention, FIG. 1(b) is a partial enlargement of a first cup seal portion in FIG. 1(a), and FIGS. 2(a) and (b) are diagrams showing the cup seal used in the master cylinder. The "front" and "rear" of the master cylinder in the following description refer respectively to "left" and "right" in the drawings.

As shown in FIG. 1(a), a plunger type master cylinder 1, being used as a master cylinder of a brake system, includes a cylinder main body 2. A cylinder hole 3 is formed inside the cylinder main body 2.

A primary piston 4 and secondary piston 5 are slidably inserted into the cylinder hole 3. The primary piston 4 is configured so that it moves to the left due to an unshown brake pedal, or brake booster which boosts and outputs a tread force of the brake pedal. Because of the primary piston 4 and secondary piston 5, a first hydraulic chamber 6 is formed demarcatedly between the primary piston 4 and secondary piston 5, and a second hydraulic chamber 7 is formed demarcatedly between the secondary piston 5 and a bottom portion 3a of the cylinder hole 3, in the cylinder hole 3.

A first axle member 8 being provided in the first hydraulic chamber 6, a left-and-right pair of first and second retainers 9 and 10 are provided for the first axle member 8. The first retainer 9 is fixed to the first axle member 8, but the second retainer 10 can slide along the first axle member 8. In this case, by the second retainer 10 coming into contact with a flange 8a formed at the right end of the first axle member 8, the first and second retainers 9 and 10 are set in a condition with a maximum distance apart from each other shown in FIG. 1(a). A first return spring 11 is provided contractedly between the first and second retainers 9 and 10. The first retainer 9 being constantly in contact with the secondary piston 5, and the second retainer 10 being constantly in contact with the primary piston 4, at the inoperative time of the master cylinder 1 shown in FIG. 1(a), the primary piston 4 and secondary piston 5 are set in a condition with a maximum distance apart.

Also, a second axle member 12 being disposed in the second hydraulic chamber 7, a third retainer 13 is fitted slidably onto the second axle member 12. In this case, by the third retainer 13 coming into contact with a flange formed at the right end of the second axle member 12, the third retainer 13 are set in a condition with a maximum distance apart from each other shown in FIG. 1(a). A second return spring 14 is provided contractedly between a flange formed at the left end of the second axle member 12 and the third retainer 13. The third retainer 13 being constantly in contact with the secondary piston 5, and the second axle member 12 being constantly in contact with the bottom portion 3a of the cylinder hole 3, at the inoperative time of the master cylinder 1 shown in FIG. 1(a), the secondary piston 5 is set in a condition with a maximum distance apart from the bottom portion 3a.

A reservoir 15 storing a braking liquid, which is a hydraulic fluid, is provided in the cylinder main body 2. The reservoir 15 can communicate with the first hydraulic chamber 6 via a first communication passage 16, and a first relief port 17, formed in the primary piston 4, which is in constant communication with the first hydraulic chamber 6. The first relief port 17 is configured of a radial direction communication hole, provided boredly through a left end side tubular portion 4a of the primary piston 4, which connects the first hydraulic chamber 6 on the inner peripheral side of the primary piston 4 and the first communication passage 16 on the outer peripheral side. Also, the reservoir 15 can communicate with the second hydraulic chamber 7 via a second communication passage 18, and a second relief port 19 formed in the secondary piston 5. In the same way as the first relief port 17, the second relief port 19 is also configured of a radial direction communication hole, provided boredly through a tubular portion 5a of the secondary piston 5, which connects the second hydraulic chamber 7 on the inner peripheral side of the secondary piston 5 and the second communication passage 18 on the outer peripheral side.

A depressed portion 20 is formed in the inner peripheral surface of the cylinder hole 3 in which the primary piston 4 is disposed. As shown in FIG. 1(b), as well as a circular first cup seal 21 being housed in the depressed portion 20, the primary piston 4 passes through the first cup seal 21 liquid-tightly and slidably.

As shown in FIGS. 2(a) to (d), the circular first cup seal 21 includes a circular base portion 21a, which is provided extendingly in a radial direction, and which the primary piston 4 slidably passes through, a circular inner lip portion 21b, which is provided extendingly in an axial direction from an inner peripheral side end portion of the base portion 21a, and which the primary piston 4 slidably passes through, a circular outer lip portion 21c, which is provided extendingly in the axial direction from an outer peripheral side end portion of the base portion 21a, and which comes into contact with a bottom wall 20a of the depressed portion 20 in such a way that they can be moved apart, and an intermediate lip portion 21d, which is positioned in a radial direction midpoint of the inner lip portion 21b and outer lip portion 21c, and which is provided extendingly from a left surface side of the base portion 21a in a leftward axial direction.

In this case, a leading end portion of the outer lip portion 21c opposes a first side wall 20c on a forward side of the depressed portion 20. Also, the outer lip portion 21c being elastically flexible, it easily draws in the braking liquid from the reservoir 15. Furthermore, an axial direction length of the outer lip portion 21c is formed to be approximately equivalent to a length of the inner lip portion 21b. By a leading end portion outer peripheral surface of the outer lip portion 21c coming into contact with the bottom wall 20a of the depressed portion 20, a seal portion $21c_1$, which seals a space between itself and the bottom wall 20a, is formed.

Then, at the inoperative time of the master cylinder 1, in the condition in which the first cup seal 21 is housed in the depressed portion 20 as shown in FIGS. 1(a) and (b), the seal portion $21c_1$, comes into contact with the bottom surface 20a.

The intermediate lip portion 21d is such that a predetermined number (12 in the example shown) of intermediate lip portions, including first intermediate lip portions $21d_1$ and second intermediate lip portions $21d_2$, are disposed in a circular form, leaving predetermined intervals, in a peripheral direction. In this case, the first and second intermediate lip portions $21d_1$ and $21d_2$ are disposed alternately and intermittently in the peripheral direction. Communication passages $21d_3$, which connect the inner and outer peripheral sides of the intermediate lip portion 21d, are formed by peripheral direction intervals (portions with no lip) between mutually adjacent first and second intermediate lip portions $21d_1$ and $21d_2$. Consequently, the first intermediate lip portions $21d_1$, communication passages $21d_3$, second intermediate lip portions $21d_2$, and communication passages $21d_3$, are cyclically disposed, in this order, in the peripheral direction.

Consequently, as shown in FIG. 2(b), the first cup seal 21 is such that a radial direction cross-section in the communication passages $21d_3$ is formed in an approximate inverse U shape (an approximate left-opening U shape). Also, as shown in FIGS. 2(c) and (d), the first cup seal 21 is such that a radial direction cross-section of the first and second intermediate lip portions $21d_1$ and $21d_2$ is formed in an approximate inverse E shape. In this case, a length (height) $L_2$ of the second intermediate lip portions $21d_2$ is set to be a predetermined amount less than a length (height) $L_1$ in the axial direction of the first intermediate lip portions $21d_1$ ($L_2 < L_1$) in a condition in which the first cup seal 21 is free. The thicknesses of the first and second intermediate lip portions $21d_1$ and $21d_2$ are set to be mutually equivalent, or approximately equivalent.

As shown in FIG. 3(b), in a condition in which the first cup seal 21 is embedded in the depressed portion 20, the leading ends of the first intermediate lip portions $21d_1$ are disposed slightly away from the first side wall 20c of the depressed portion 20. Then, in this condition, when a predetermined pressure or more is applied to the right surface side (back surface side) of the base portion 21a of the first cup seal 21, the first cup seal 21 moves in a forward axial direction, and the leading ends of the first intermediate lip portions $21d_1$ are brought into contact with the first side wall 20c of the depressed portion 20. By the leading ends coming into contact with the first side wall 20c, a further movement of the first cup seal 21 in the forward axial direction is prevented.

Also, in a condition in which the first cup seal 21 is embedded in the depressed portion 20, and no pressure is applied to the right surface (back surface) of its base portion 21a, the leading ends of the second intermediate lip portions $21d_2$ are disposed farther apart from the first side wall 20c of the depressed portion 20 than the leading ends of the first intermediate lip portions $21d_1$.

An axial direction passage 22, positioned in a vicinity behind the first cup seal 21, which connects the first relief port 17 and first communication passage 16, is provided in the cylinder main body 2. The axial direction passage 22 is in constant communication with the right surface of the base portion 21a of the first cup seal 21.

A depressed portion (reference numeral omitted) which is the same as the previously described depressed portion 20 is also formed in the inner peripheral surface of the cylinder hole 3 in which the secondary piston 5 is disposed. As well as a circular second cup seal 23 being housed in the depressed portion, the secondary piston 5 passes through the second cup seal 23 liquid-tightly and slidably. The second cup seal 23 is formed in exactly the same way as the first cup seal 21. Consequently, a detailed description thereof will be omitted.

Furthermore, although not clearly shown in FIG. 1(a), an axial direction passage, exactly the same as the axial direction passage 22, which connects the second communication passage 18 and second relief port 19 is also formed in a vicinity behind the second cup seal 23. Then, this axial direction passage too is in constant communication with the right surface of a base portion of the second cup seal 23 (the same as the right surface of the base portion 21a of the first cup seal 21).

The first hydraulic chamber 6, as well as being communicated with a first output port 24, is connected to a wheel cylinder of a wheel of one brake system, of two unshown brake systems, via the first output port 24. Also, the second hydraulic chamber 7, as well as being communicated with a second output port 25, is connected to a wheel cylinder of a wheel of the other brake system, of the two unshown brake systems, via the second output port 25.

A cup seal 26 being provided in a rear end portion inner periphery of the cylinder hole 3 of the cylinder main body 2, the primary piston 4 passes slidably through the cup seal 26. The cup seal 26, being formed of a heretofore known cup seal differing from the previously described first and second cup seals 21 and 23, maintains liquid-tightness between the inner peripheral surface of the cylinder hole 3 of the cylinder main body 2 and the outer peripheral surface of the primary piston 4. Because of this, the braking liquid of the first communication passage 16 is prevented from leaking into the exterior from the cylinder main body 2.

In the same way, a cup seal 27 being provided in a portion of the cylinder hole 3 of the cylinder main body 2 in a vicinity behind the second communication passage 18, the secondary piston 5 passes slidably through the cup seal 27. The cup seal 27, also being formed of a heretofore known cup seal differing from the previously described first and second cup seals 21 and 23, maintains liquid-tightness between the inner peripheral surface of the cylinder hole 3 of the cylinder main body 2 and the outer peripheral surface of the secondary piston 4. Because of this, the hydraulic pressure of the first hydraulic chamber 6 is maintained.

Next, a description will be given of an operation of the master cylinder 1 of the example configured in this way.

In the brake inoperative condition shown in FIG. 1(a), the primary piston 4 and secondary piston 5 are both set in the inoperative positions shown in FIG. 1(a). The inoperative position is a withdrawal limit position of the two pistons 4 and 5. In the withdrawal limit position of the primary piston 4, one portion of the rear end side of the first relief port 17 is positioned behind the rear end of the base portion 21a of the first cup seal 21, and a predetermined gap $\alpha$ (shown in FIG. 1(b)) is formed. Then, by means of the gap $\alpha$, the first relief port 17 and first communication passage 16 communicate via the axial direction passage 22. Consequently, the first hydraulic chamber 6 communicates with the reservoir 15, and the inside of the first hydraulic chamber 6, no hydraulic pressure being generated, is at atmospheric pressure. In the same way, in the withdrawal limit position of the secondary piston 5, the second hydraulic chamber 7 communicates with the reservoir 15, and the inside of the second hydraulic chamber 7, no hydraulic pressure being generated, is at atmospheric pressure.

On the brake pedal being pressed down upon, and the primary piston 4 advancing, the whole of the first relief port 17 is closed off by the base portion 21a and inner lip portion 21b of the first cup seal 21. For this reason, the first relief port 17 and first communication passage 16 being blocked off, the first hydraulic chamber 6 is blocked off from the reservoir 15, and a hydraulic pressure according to the pedal tread force is generated in the first hydraulic chamber 6. Also, the secondary piston 5 advances in accordance with the tread force transmitted, via the first return spring 11, due to the advancing of the primary piston 4, and in the same way, the second hydraulic chamber 7 is blocked off from the reservoir 15, and a hydraulic pressure is generated in the second hydraulic chamber 7.

Then, as shown in FIGS. 3(a) and (b), the first cup seal 21 is pressed backward in the depressed portion 20 in accordance with the hydraulic pressure in the first hydraulic chamber 6, and the rear end surface of the base portion 21a is brought into close contact with a second side wall 20b of the depressed portion 20. Then, the base portion 21a seals a space between itself and the second side wall 20b of the depressed portion 20. Also, as well as the inner lip portion 21b of the first cup seal 21 being brought into close contact with the outer peripheral surface of the primary piston 4, the seal portion $21c_1$ of the outer lip portion 21c of the first cup seal 21 is brought into close contact with the bottom wall 20a of the depressed portion 20. Then, the seal portion $21c_1$ seals a space between itself and the bottom wall 20a of the depressed portion 20. That is, the base portion 21a and seal portion $21c_1$, being disposed in series, configure a double seal portion against the flow of the braking liquid from the first hydraulic chamber 6 toward the reservoir 15, passing between the outer peripheral surface of the outer lip portion 21c and bottom wall 20a of the depressed portion 20, and between the rear end surface of the base portion 21a and second side wall 20b of the depressed portion 20.

Because of this, the first hydraulic chamber 6 being sealed off from the reservoir 15, the braking liquid of the first hydraulic chamber 6 does not leak into the reservoir 15, and the hydraulic pressure of the first hydraulic chamber 6 is maintained. At this time, it is hypothesized that the seal surface pressure of the seal portion $21c_1$ is weak in part, and the braking liquid of the first hydraulic chamber 6 leaks from, of the sealed portion between the seal portion $21c_1$ and bottom wall 20a of the depressed portion 20, the portion with the weak seal surface pressure. However, the braking liquid which leaks from the seal portion $21c_1$ is blocked off by the sealed portion between the base portion 21a and second side wall 20b of the depressed portion 20, and does not leak toward the axial direction passage 22.

In this way, the leaking of the braking liquid of the first hydraulic chamber 6 is reliably prevented by the double seal configured of the seal portion $21c_1$ and base portion 21a disposed in series in the direction of flow of the braking liquid, and the hydraulic pressure of the first hydraulic chamber 6 is highly-maintained.

On the primary piston 4 advancing further, the hydraulic pressure of the first hydraulic chamber 6 rises. The hydraulic pressure of the first hydraulic chamber 6 is fed from the first output port 24 to the wheel cylinder of one of the brake systems, and the brake of the one brake system operates.

On the secondary piston 5 advancing, a hydraulic pressure is generated in the second hydraulic chamber 7. In the same way, a leaking of the braking liquid of the second hydraulic chamber 7 is reliably prevented by a double seal configured of the base portion and a seal portion of the second cup seal 23, and the hydraulic pressure of the second hydraulic chamber 7 is highly-maintained.

On the secondary piston 5 advancing further, the hydraulic pressure of the second hydraulic chamber 7 rises. The hydraulic pressure of the second hydraulic chamber 7 is fed from the second output port 25 to the wheel cylinder of the other brake system, and the brake of the other brake system operates.

On releasing the pressing down of the brake pedal in the condition in which the brake is operating, the primary piston 4 withdraws under the spring force of the first return spring 11, and attempts to return to the inoperative position, meaning that the hydraulic pressure of the first hydraulic chamber 6 falls, momentarily becoming slightly negative. Also, the rear end side of the outer lip portion 21c, communicating with the reservoir 15, is at atmospheric pressure. Consequently, a difference in pressure occurs between the front surface side and rear surface side of the base portion 21a, and the base portion 21a is pressed forward by the difference in pressure For this reason, as shown in FIGS. 3(c) and (d), the base portion 21a elastically flexes forward and, as well as a gap occurring between the rear end surface of the base portion 21a and second side wall 20b of the depressed portion 20, the leading ends of the second intermediate lip portions $21d_2$ make contact with the first side wall 20c. Also, as well as the leading end side of the outer lip portion 21c elastically flexing inward, the first and second intermediate lip portions $21d_1$ and $21d_2$ elastically flex inward, meaning that the whole of the base portion 21a moves slightly forward, and the gap between the rear end surface of the base portion 21a and second side wall 20b of the depressed portion 20 becomes larger.

Because of this, the braking liquid of the reservoir 15 flows into the front side of the first cup seal 21 through the first communication passage 16, the axial direction passage 22, the gap between the rear end surface of the base portion 21a and second side wall 20b of the depressed portion 20, and the gap between the bottom wall 20a and outer lip portion 21c.

In this case, with the first cup seal 21 of the example, as the length $L_2$ of the second intermediate lip portions $21d_2$ is set to be shorter than the length $L_1$ of the first intermediate lip portions $21d_1$, and the communication passages $21d_3$, in which there is no lip portion, are formed on either end side of the second intermediate lip portions $21d_2$, a rib effect of the second intermediate lip portions $21d_2$ is effectively small. That is, the portion of the base portion 21a in which the second intermediate lip portions $21d_2$, and the communication passages $21d_3$ on either end side thereof in which there is no lip portion, are disposed is more pliant than the portion of the base portion 21a in which the first intermediate lip portions $21d_1$ are disposed. In particular, by the communication passages $21d_3$, in which there is no lip portion, being formed on either end side of the second intermediate lip portions $21d_2$, the portion of the base portion 21a in which the second intermediate lip portions $21d_2$ and communication passages $21d_3$ are disposed is effectively pliant in comparison with the cup seal described in the previously described JP-A-2006-123879. For this reason, the portion of the base portion 21a with the second intermediate lip portions $21d_2$ and communication passages $21d_3$ can elastically deform easily and effectively. That is, as well as the portion of the base portion 21a with the second intermediate lip portions $21d_2$ and communication passages $21d_3$ being an easy elastic deformation portion, the portion of the base portion 21a with the first intermediate lip portions $21d_1$ is a difficult elastic deformation portion.

Consequently, as shown in FIGS. 3(c) and (d), the portion of the base portion 21a with the second intermediate lip portions $21d_2$ flexes forward considerably, and the gap between the rear end surface of the base portion 21a and second side wall 20b of the depressed portion 20 becomes its largest. Consequently, a braking liquid flow passage with a large passage area is formed between the rear end surface of the base portion 21a and second side wall 20b of the depressed portion 20. Because of this, a large amount of braking liquid can flow.

Furthermore, the braking liquid, as well as causing the first intermediate lip portions $21d_1$ to flex inward, and flowing into the first hydraulic chamber 6, flows into the first hydraulic chamber 6 through the gap between the leading ends of the second intermediate lip portions $21d_2$ and first side wall 20c of the depressed portion 20, and through the communication passages $21d_3$.

In this way, the base portion and seal portion $21c_1$, in response to the flow of the hydraulic fluid from the reservoir 15 to the first hydraulic chamber 6, separate from the bottom wall 20a of the depressed portion 20 and second side wall 20b respectively, and configure a sealed portion which forms a gap between themselves and the bottom wall 20a and second side wall 20b. By this means, the braking liquid is reliably supplied from the reservoir 15 to the first hydraulic chamber 6, the hydraulic pressure of the first hydraulic chamber 6 falls, and the primary piston 4 withdraws smoothly and swiftly under a bias force of the first return spring 11.

Due to the withdrawal of the primary piston 4 and fall in hydraulic pressure of the first hydraulic chamber 6, the secondary piston 5 attempts to withdraw under a bias force of the second return spring 14. At this time, in the same way as with the previously described first hydraulic chamber 6, a large amount of the braking liquid of the reservoir 15 is supplied to the second hydraulic chamber 7. Consequently, the secondary piston 5 also withdraws smoothly and swiftly, and the hydraulic pressure of the second hydraulic chamber 7 falls.

On the primary piston 4 withdrawing, and one portion of the rear end side of the first relief port 17 being positioned behind the rear end of the base portion 21a of the first cup seal 21, as shown in FIGS. 1(a) and (b), the first relief port 17 and first communication passage 16 communicate via the axial direction passage 22. Because of this, the braking liquid of the first hydraulic chamber 6 is exhausted to the reservoir 15 through the first relief port 17 and first communication passage 16, and the hydraulic pressure of the first hydraulic chamber 6 falls further.

In the same way, by the secondary piston 5 withdrawing, the second relief port 19 and second communication passage 18 communicate, the braking liquid of the second hydraulic chamber 7 is exhausted to the reservoir 15 through the second relief port 19 and second communication passage 18, and the hydraulic pressure of the second hydraulic chamber 7 falls further.

On the two pistons 4 and 5 reaching the withdrawal limit positions shown in FIG. 1(a), the two pistons 4 and 5 stop, the first and second hydraulic chambers 6 and 7 are at atmospheric pressure, the master cylinder 1 is in the inoperative condition, and the brakes are released.

In this way, according to the first and second cup seals 21 and 23 of the example, as the intermediate lip portion 21d disposed in a circular form is configured of a cyclical disposition of the longer first intermediate lip portions $21d_1$, the communication passages $21d_3$, which are the portions with no lip, the shorter second intermediate lip portions $21d_2$, and the communication passages $21d_3$, which are the portions with no lip, the portion of the base portion 21a of the first and second cup seals 21 and 23 in which the shorter second intermediate lip portions $21d_2$ are disposed, and the portion in which the communication passages $21d_3$, the portions with no lip, positioned on either end side of this portion are disposed, can easily be made elastically deformable.

Consequently, with the portion in which the second intermediate lip portions $21d_2$ are disposed and the communication passages $21d_3$, the portions with no lip, it is possible to form an easy elastic deformation portion, which can easily elastically deform, and a difficult elastic deformation portion, in which an elastic deformation is not as easy as in the easy elastic deformation portion. Because of this, when the braking liquid flows from the rear surface to the front surface of the first and second cup seals 21 and 23, passing between the rear surface of the base portion 21a and the front surface of the second side wall 20b of the depressed portion 20, and between the outer peripheral surface of the outer seal portion 21c and the bottom wall 20a of the depressed portion 20, the easy elastic deformation portion of the base portion 21a elastically deforms, easily separating from the second side wall 20b of the depressed portion 20 and, as well as it being possible to prevent a sticking of the base portion 21a to the second side wall 20b, it is possible to reliably open a valve in a check valve function included in the first and second cup seals 21 and 23. Then, as it is possible to prevent a sticking of the base portion 21a to the second side wall 20b, it is possible to form a flow passage with a larger passage area.

Also, according to the master cylinder 1 of this example, when supplying the braking liquid to the first and second hydraulic chambers 6 and 7 of the master cylinder 1, as the portion of the base portion 21a of the first and second cup seals 21 and 23 in which the second intermediate lip portions $21d_2$ are disposed easily elastically deforms, it is possible to form a braking liquid flow passage with a large passage area. Because of this, it being possible to supply a large amount of braking liquid to the first and second hydraulic chambers 6 and 7 when supplying the braking liquid, it is possible to increase liquid suppliability.

Furthermore, as a large amount of braking liquid can be supplied to the first and second hydraulic chambers 6 and 7 due to the first and second cup seals 21 and 23, it is possible to carry out the withdrawal of the primary piston 4 and secondary piston 5 smoothly and swiftly when the operation is stopped. Consequently, it is possible to increase responsiveness when the two pistons 4 and 5 withdraw.

In this way, according to the master cylinder 1 of the example, it is possible to increase the responsiveness when the operation is stopped, while maintaining the pressure in the first and second hydraulic chambers 6 and 7 at a high level at an operative time, and moreover, it is possible to obtain a good liquid suppliability.

FIGS. 4(a) to (d) are the same kinds of drawing as FIGS. 2(a) to (d) respectively, and show another example of the cup seals used in the master cylinder of the previously described example. By giving the same reference numerals and characters to components which are the same as those of the previously described example, a detailed description thereof will be omitted.

With the first cup seal 21 of the example shown in the previously described FIGS. 2(a) to (d), the length $L_2$ of the second intermediate lip portions $21d_2$ configuring the intermediate lip portion 21d is less than the length $L_1$ of the first intermediate lip portions $21d_1$, and the portion of the base portion 21a in which the second intermediate lip portions $21d_2$ are formed can be easily elastically deformed. As opposed to this, as shown in FIGS. 4(a) to (d), with the first cup seal 21 of the example, a thickness $t_2$ of fourth intermediate lip portions $21d_5$ configuring the intermediate lip portion 21d is set to be less than a thickness $t_1$ of third intermediate lip portions $21d_4$ ($t_2 < t_1$), and a portion of the base portion 21a in which the fourth intermediate lip portions $21d_5$ are formed can be easily elastically deformed. In this case, the lengths in the axial direction of each of the third and fourth intermediate lip portions $21d_4$ and $21d_5$ are set to be mutually equivalent, or approximately equivalent.

With the first cup seal 21 of the example too, the third intermediate lip portions $21d_4$, communication passages $21d_3$, fourth intermediate lip portions $21d_5$, and communication passages $21d_3$, are cyclically disposed, in this order, in the peripheral direction. The second cup seal 23 of the example too is configured in exactly the same way as the first cup seal 21 of the example. In this case, as well as the portion of the base portion 21a in which the fourth intermediate lip portions $21d_5$ are disposed being an easy elastic deformation portion, which can easily elastically deform, the portion of the base portion 21a in which the third intermediate lip portions $21d_4$ are disposed is a difficult elastic deformation portion, in which an elastic deformation is not as easy as in the easy elastic deformation portion.

Figure 5:
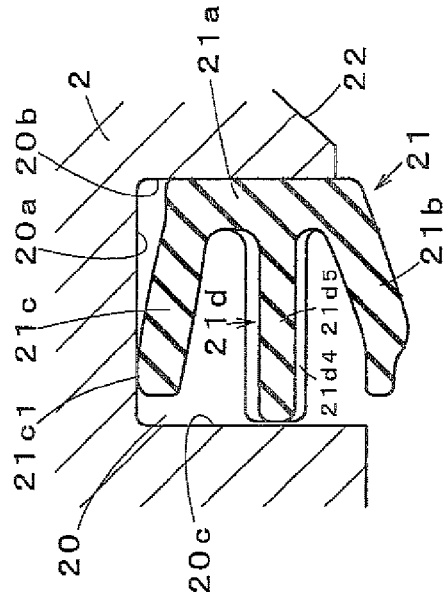
FIG. 5(a) is a diagram showing behavior of the cup seal of the example shown in FIG. 4 at an activation time of the master cylinder.
FIG. 5(b) is a sectional view along the line VB-VB in FIG. 5(a)
FIG. 5(c) is a diagram showing behavior of the cup seal of the example shown in FIG. 4 at a liquid supply time of the master cylinder.
FIG. 5(d) is a sectional view along the line VD-VD in FIG. 5(c).
Figure 5:
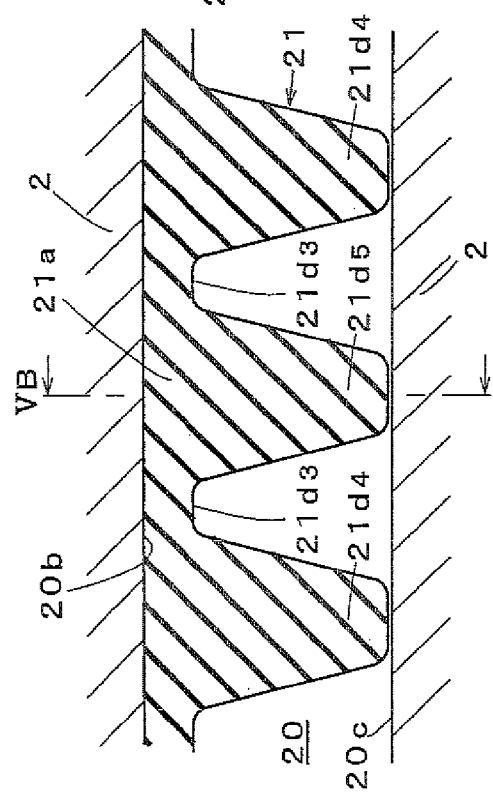
Figure 5:
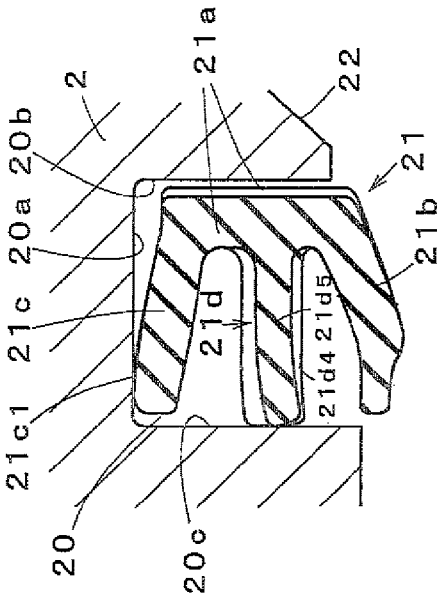
Figure 5:
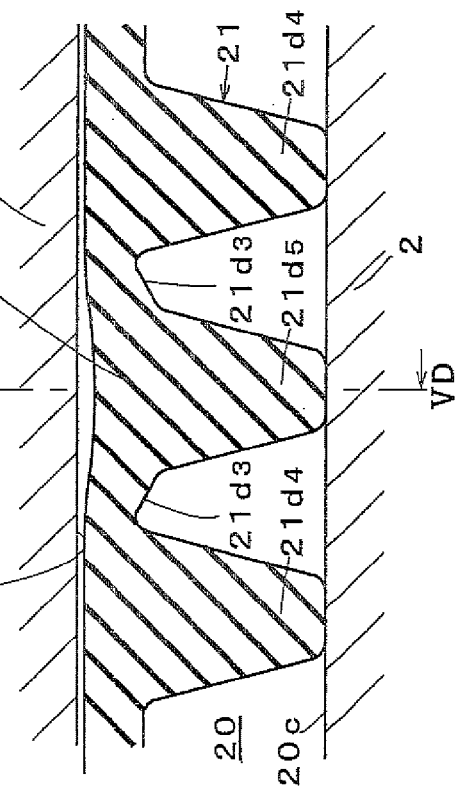

In the first and second cup seals 21 and 23 of the example too, in the same way as in the first and second cup seals 21 and 23 of the previously described example, as shown in FIGS. 5(a) and (b), when the master cylinder 1 operates, the first and second cup seals 21 and 23 move backward and, as well as the rear surface of the base portion 21a making contact with the second side wall 20b of the depressed portion 20, the seal portion 21c1 of the outer lip 21c makes contact with the bottom wall 20a of the depressed portion 20. Also, as shown in FIGS. 5(c) and (d), at the liquid supply time of the master cylinder 1, the first and second cup seals 21 and 23 move forward and, as well as the rear surface of the base portion 21a separating from the second side wall 20b of the depressed portion 20, the portion of the base portion 21a in which the fourth intermediate lip portions $21d_5$ are disposed elastically deforms considerably, and a braking liquid flow passage with a large passage area is formed.

Other configurations and other working effects of each of the first and second cup seals 21 and 23, and master cylinder 1, of the example are all the same as the first and second cup seals 21 and 23, and master cylinder 1, of the previously described example.

In the previously described examples, the first and second intermediate lip portions $21d_1$ and $21d_2$, or the third and fourth intermediate lip portions $21d_4$ and $21d_5$, are alternately disposed regularly one by one, and on either side of the communication passages $21d_3$, but it is also possible to dispose the first and second intermediate lip portions $21d_1$ and $21d_2$, or the third and fourth intermediate lip portions $21d_4$ and $21d_5$, alternately irregularly, and on either side of the communication passages $21d_3$. That is, it is possible to optionally set the numbers and disposition order of the first and second intermediate lip portions $21d_1$ and $21d_2$, or the third and fourth intermediate lip portions $21d_4$ and $21d_5$ as, for example, mutually differing numbers, an irregular disposition order, or the like.

Figure 4:
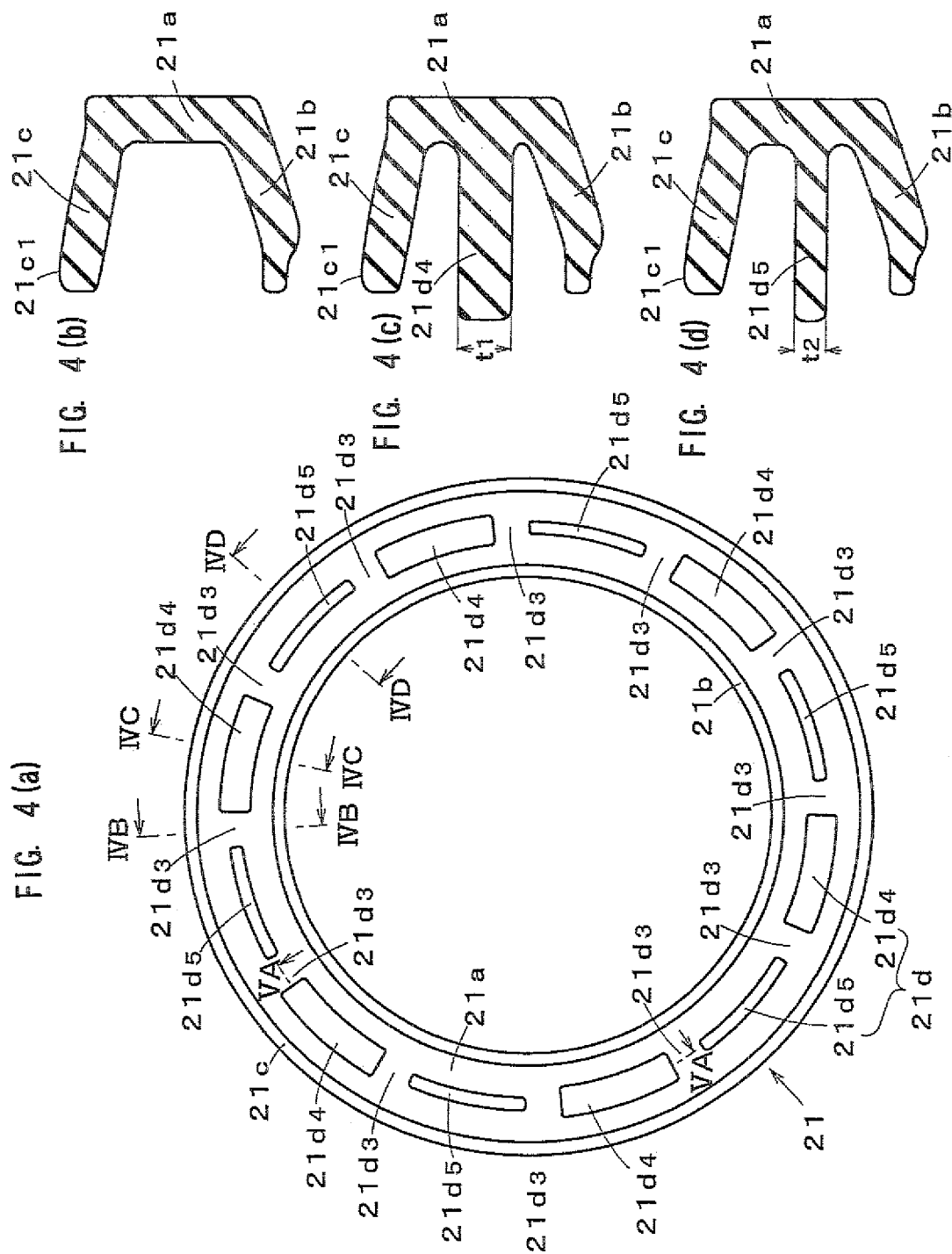
FIGS. 4(a) to (d) are diagrams showing another example of the embodiment of the cup seal used in the master cylinder of the example shown in FIG. 1.

Also, with the example shown in FIG. 4, the axial direction length of the fourth intermediate lip portions $21d_5$ can also be made less than the axial direction length of the third intermediate lip portions $21d_4$. That is, it is also possible to make both the axial direction lengths and thicknesses of the third and fourth intermediate lip portions $21d_4$ and $21d_5$ mutually different.

Furthermore, it is also possible to dispose the first intermediate lip portions $21d_1$ and second intermediate lip portions $21d_2$ of the example shown in FIG. 2, and the third intermediate lip portions $21d_4$ and fourth intermediate lip portions $21d_5$ of the example shown in FIG. 4, mixed in a circular form.

Furthermore, in each of the previously described examples, the peripheral direction length of each of the first intermediate lip portions $21d_1$ and second intermediate lip portions $21d_2$, or the peripheral direction length of each of the third intermediate lip portions $21d_4$ and fourth intermediate lip portions $21d_5$, are all set to be equivalent, but it is possible to make the peripheral direction length of the second intermediate lip portions $21d_2$ less than the peripheral direction length of the first intermediate lip portions $21d_1$, or the peripheral direction length of the fourth intermediate lip portions $21d_5$ less than the peripheral direction length of the third intermediate lip portions $21d_4$.

Furthermore, in the previously described examples, the first and second cup seals 21 and 23 are both taken to be double seals configured of the seal portion of the outer lip and the base portion, but it is also possible to arrange that the sealing, not being carried out by the base portion, is done only by the seal portion of the outer lip. In this case, for example, by forming a predetermined number of radial direction grooves, communicating from the inner lip side to the outer lip side, in the rear surface of the base portion, leaving predetermined intervals in the peripheral direction, it is possible to increase the braking liquid suppliability using the grooves.

Furthermore, in the previously described examples, the first side wall 20c of the depressed portion 20 in which the first cup seal 21 is housed is taken to be a flat surface perpendicular to the axial direction of the cylinder 3 but, as shown by the two-dot chain line in FIG. 1(b), it is also possible to make it a tapered surface 20c' wherein an opening end portion of the first side wall 20c of the depressed portion 20 slopes forward toward an opening end.

Furthermore, the cup seal of the invention, not being limited to the master cylinder of a brake device as in the previously described examples, can be used in any kind of cylinder device provided that it is a cylinder device which, being a cylinder device configured of a cylinder, and a sliding member disposed in such a way that it can move inside the cylinder relative to the axial direction thereof, prevents the flow of hydraulic fluid from one side of the axial direction of the cup seal to the other side of the axial direction, and allows the flow of the hydraulic fluid from the other side of the axial direction of the cup seal to the one side of the axial direction.

Furthermore, the master cylinder of the invention, not being limited to the master cylinder of a brake device as in the previously described examples, can be applied to any kind of hydraulic device, including the master cylinder of a clutch device, provided that it generates hydraulic pressure in a hydraulic chamber with the advancing of a piston. Also, in the previously described examples, a description has been given of a tandem master cylinder in which two pistons are disposed in series, but it is possible to apply the master cylinder of the invention to any kind of master cylinder, including a single master cylinder, provided that it is a plunger type master cylinder.

INDUSTRIAL APPLICABILITY

The cup seal and master cylinder according to the invention can preferably be used in a plunger type master cylinder which includes a cup seal, generates hydraulic pressure in a hydraulic chamber when a piston advances, and supplies a hydraulic braking liquid to the hydraulic chamber when the piston withdraws. In particular, it can preferably be used in a master cylinder of a brake or clutch in a vehicle, such as an automobile.

The invention claimed is:

1. A cup seal comprising: a circular base portion housed in a depressed portion and extending in a radial direction, a circular inner lip portion disposed in the base portion and extending in an axial direction from the inner peripheral side end portion thereof, a circular outer lip portion disposed in the base portion and extending in the axial direction from the outer peripheral side end portion thereof, and separably making contact with a bottom wall of the depressed portion, and an intermediate lip portion disposed in the base portion, positioned between the inner lip portion and outer lip portion, and extending in the axial direction, wherein the base portion includes an easy elastic deformation portion, which elastically deforms in the axial direction comparatively easily, and a difficult elastic deformation portion, which does not elastically deform in the axial direction as easily as the easy elastic deformation portion, wherein in the intermediate lip portion, a plurality of first and second intermediate lip portions are disposed in a circular form, and intermittently, either side of intervals with no lip portion extending from the base portion, the first intermediate lip portions being disposed in the difficult elastic deformation portion of the base portion and the second intermediate lip portions being disposed in the easy elastic deformation portion of the base portion, at least one of an axial direction length and a thickness of the second intermediate lip portions being less than that of the first intermediate lip portions.

2. The cup seal according to claim 1, wherein the first intermediate lip portions and the second intermediate lip portions are disposed alternately, either side of the intervals with no lip portion.

3. A master cylinder comprising a cylinder main body which has a cylinder hole, a piston which demarcates a hydraulic chamber slidably inserted into the cylinder hole, a communication passage, provided in the cylinder main body, which communicates with a reservoir in which is stored a hydraulic fluid, a relief port, formed in the piston, which constantly communicates with the hydraulic chamber, and connects the communication passage and hydraulic chamber, and a seal member which is housed in a depressed portion of the inner peripheral surface of the cylinder hole of the cylinder main body, is slidably passed through by the piston, and seals a space between the inner peripheral surface of the cylinder hole and the outer peripheral surface of the piston, wherein the communication passage and relief port communicate at an inoperative time, and at an operative time, the piston moves, and the communication passage and relief port are blocked off by the seal member, wherein the seal member is configured of the cup seal according to claim 1.

4. The master cylinder according to claim 3, wherein the first intermediate lip portions and the second intermediate lip portions are disposed alternately, either side of the intervals with no lip portion.

5. The master cylinder according to claim 3 wherein the axial direction length of the second intermediate lip portions is less than that of the first intermediate lip portions.

6. The master cylinder according to claim 3 wherein the thickness of the second intermediate lip portions is less than that of the first intermediate lip portions.

7. The cup seal according to claim 1 wherein the axial direction length of the second intermediate lip portions is less than that of the first intermediate lip portions.

8. The cup seal according to claim 1 wherein the thickness of the second intermediate lip portions is less than that of the first intermediate lip portions.

* * * * *